(12) United States Patent
Ellington et al.

(10) Patent No.: US 7,687,577 B2
(45) Date of Patent: Mar. 30, 2010

(54) THERMOFORMABLE POLYCARBONATE/POLYESTER COMPOSITIONS AND USES

(75) Inventors: Donald Ellington, Evansville, IN (US); Yantao Zhu, Evansville, IN (US)

(73) Assignee: SABIC Innovative Plastics IP B.V. (NL)

( * ) Notice: Subject to any disclaimer, the term of this patent is extended or adjusted under 35 U.S.C. 154(b) by 68 days.

(21) Appl. No.: 11/782,798

(22) Filed: Jul. 25, 2007

(65) Prior Publication Data

US 2009/0026663 A1 Jan. 29, 2009

(51) Int. Cl.
*C08L 67/02* (2006.01)

(52) U.S. Cl. .................. 525/165; 525/173; 525/174; 525/438

(58) Field of Classification Search ............... 525/165, 525/173, 174, 438
See application file for complete search history.

(56) References Cited

U.S. PATENT DOCUMENTS

| | | | |
|---|---|---|---|
| 4,188,314 A | 2/1980 | Fox et al. | |
| 4,467,057 A | 8/1984 | Dieck et al. | |
| 5,207,967 A | 5/1993 | Small, Jr. et al. | |
| 5,441,997 A * | 8/1995 | Walsh et al. | 524/147 |
| 5,648,411 A * | 7/1997 | Gallucci et al. | 524/156 |
| 5,994,467 A | 11/1999 | Farah et al. | |
| 6,214,897 B1 | 4/2001 | Tung et al. | |
| 6,486,251 B1 | 11/2002 | Patel | |
| 6,569,957 B2 | 5/2003 | Williams et al. | |
| 2007/0054982 A1 | 3/2007 | Banerjie et al. | |

FOREIGN PATENT DOCUMENTS

| | | | |
|---|---|---|---|
| EP | 0604080 A1 | | 6/1994 |
| EP | 0803537 A2 | | 10/1997 |
| JP | 7136269 A | | 5/1995 |
| JP | 2006013492 A | * | 1/2006 |
| WO | 8701122 | | 2/1987 |
| WO | 9318089 | | 9/1993 |
| WO | 9401495 | | 1/1994 |
| WO | 9817725 | | 4/1998 |
| WO | 9963002 | | 12/1999 |
| WO | 0236685 A2 | | 5/2002 |
| WO | 2004069931 A1 | | 8/2004 |
| WO | 2005066277 A1 | | 7/2005 |
| WO | 2006002816 A1 | | 1/2006 |
| WO | 2006052697 A1 | | 5/2006 |

OTHER PUBLICATIONS

European Patent Office, PCT International Search Report, International Application No. PCT/US2008/069917, Date of Mailing: Oct. 16, 2008.
European Patent Office, PCT Written Opinion of the ISA, International Application No. PCT/US2008/069917, Date of Mailing: Oct. 16, 2008.

* cited by examiner

*Primary Examiner*—Bernard Lipman

(57) ABSTRACT

The melt strength and hence the processing window of blends of polycarbonate and PBT can be enhanced without degradation in the surface appearance of the article produced when relatively minor amounts of certain selected polymers are added to the blend. For example, a composition that has a thermoforming processing window of at least 15° C. for an article having a weight that is more than 100 grams, may contain 15 to 80% by weight of a polycarbonate resin; 10 to 80% by weight of polybutylene terephthalate, and 1 to 15% by weight of a semicrystalline melt strength enhancer. The melt strength enhancer is polyethylene terephthalate (PET), polycyclohexane-dimethyl terephthalate (PCT), polycyclohexanedimethyl terephthalate glycol (PCT-G), and (poly)ethylene co 1,4 cyclohexanedimethylene terephthlate (PET-G), or a combination thereof.

41 Claims, No Drawings

THERMOFORMABLE POLYCARBONATE/POLYESTER COMPOSITIONS AND USES

BACKGROUND OF THE INVENTION

The present application relates to thermoformable polycarbonate/polyester compositions and to the use of such compositions in molded articles. The compositions of the invention are significant because the having a large processing window, thus facilitating the making of molded articles.

Numerous disclosures exist of products that combine polycarbonate and polyester components. As is common in combinations of polymers, these compositions make use of selected materials in selected amounts that emphasize certain desired characteristics for a particular product application, while minimizing undesirable side-effects. Thus, many compositions represent a compromise trading the good properties for a limited number of less desirable properties. In the compositions of the invention, the desired application is thermoforming or blow-molding, and the desired characteristics are a large processing window (sometimes called a forming window) and a quality product.

The processing window is the difference (in degrees C.) between the highest and the lowest temperatures over which thermoforming can be successfully performed. It is not an indication of the actual temperature required, but rather of the flexibility of the processing requirements. By way of example, XENOY™ X5300WX, a blend of polycarbonate and polybutylene terphthalate (PBT) sold by General Electric Co. has a narrow thermoforming processing window of less than 5° C.

Narrow processing windows arise because the melt strength of the material is low, such that cohesion is lost during forming if the temperature is significantly above the temperature at which the material is soft enough to form at all. To overcome this problem, the art has employed melt strength enhancers. One such material is styrene-acrylonitrile encapsulated polytetrafluoroethylene (TSAN, CAS NO: 9002-84-0) which is commonly employed to reduce drips (a consequence of added melt strength) and therefore enhance flame retardance in polycarbonate compositions. However, as demonstrated below, PC/PBT compositions made with TSAN as a melt enhancer can suffer from visible surface defects, making this approach less desirable.

WO 2005/066277 discloses polycarbonate/polyester compositions in which polycarbonate are combined with polycyclohexyldimethylterephthalate (PCT) or polycyclohexyldimethylterephthalate glycol (PCT-G). The results presented showed that melt strength was superior for compositions containing just branched polycarbonate was better than for one containing a mixture of branched and linear polycarbonate. The results further showed that higher levels of PCT-G had lower melt strength. Blends of PCT or PCT-G with polycarbonate and a poly-organosiloxane core shell impact modifier are disclosed in PCT Application WO98/17725. WO02/36685 discloses blends of 5 to 45% by weight polycarbonate and 55 to 95% of a copolyester such as PCT or PCT-G. WO 2004/069931 discloses compositions that contain polycarbonate, PCT and PCT-G for use in extrusion blow-molding.

SUMMARY OF THE INVENTION

Applicants have now found that the melt strength and hence the processing window of blends of polycarbonate and PBT can be enhanced without degradation in the surface appearance of the article produced when relatively minor amounts of certain selected polymers are added to the blend. Thus, the invention provides a composition has a thermoforming processing window of at least 15° C. for an article having a weight that is more than 100 grams, comprising:

(a) 15 to 80% by weight of a polycarbonate resin;
(b) 10 to 80% by weight of polybutylene terephthalate, and
(c) 1 to 15% by weight of a semicrystalline melt strength enhancer selected from the group consisting of polyethylene terephthalate (PET), polycyclohexanedimethyl terephthalate (PCT), polycyclohexanedimethyl terephthalate glycol (PCT-G), and (poly)ethylene co 1,4 cyclohexanedimethylene terephthlate (PET-G), and combinations thereof.

DETAILED DESCRIPTION OF THE INVENTION

Definitions

In the specification and claims of this application, the following definitions should be used:

"semicrystalline" refers to a material that is neither fully crystalline nor fully amorphous. In the present invention materials are considered semicrystalline if they have 10 to 90% crystallinity as determined by differential scanning calorimetry (DSC).

"thermoformable composition" refers to a composition which, without requiring the addition of further materials, can be heated and formed into a desired article with a surface free of visible defects. The composition may also be used in other applications for making shaped articles with heat softened materials such as, blow molding, injection molding, and extrusion.

"thermoforming processing window" refers to the temperature range between the highest temperature and the lowest temperature at which a composition of our invention can be thermoformed on a mold into an article that (i) has a weight of at least 100 g and (ii) reproduces the detailed features of the mold. The article, at its simplest form, can include a rectangular box having a wall thickness of approximately 0.5 mm, a length of approximately 5 cm, and a width of approximately 1 cm. However, it is understood that the thermoforming processing window applies is a characteristic of the material and that the material can be used to make articles of any desired shape.

"melt strength enhancer" refers to a material added to a mixture of polycarbonate and polybutylene terphthalate to increase the melt strength of the composition and thereby form a thermoformable composition with a thermoforming processing window greater by at least 10° C. than that of the same mixture of polycarbonate and polybutylene terphthalate without the added melt strength enhancer.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

In the present invention, the melt strength enhancer is a semicrystalline material selected from the group consisting of polyethylene teraphthalate, polycyclohexanedimethyl terephthalate, polycyclohexanedimethyl terephthalate glycol, and (poly)ethylene co 1,4-cyclohexane-dimethylene terephthlate), and combinations thereof. It will be appreciated by persons skilled in the art that these materials constitute a series of polymers made from combination of 2 or 3 of the same types of monomers (ethylene glycol, terephthalic acid and 1,4-cyclohexanedimethanol) in different compositional ratios.

The polymer(s) used in the melt strength enhancer are suitably selected to have a molecular weight that is generally at least 45,000 grams/mole. Depending on the polymer that is used, the molecular weight of the polymer(s) used in the melt strength enhancer can vary greatly. The molecular weight of the melt strength enhancer can range as from 45,000 grams/mole to as high as 8,000,000 grams/mole, or higher.

In the compositions for the invention, a base composition comprising 15 to 80% by weight of a polycarbonate resin; and 10 to 80% by weight of polybutylene terephthalate, is suitably modified with 2 to 15% by weight of the semicrystalline melt strength enhancer.

The melt strength enhancers of the present invention are used in blends with polycarbonate and PBT to increase the melt strength of the composition. This increase in melt strength is believed to be due in part to the higher melting temperature of this melt strength enhancer as compared to the base polymer composition, but as demonstrated below in the examples, melting temperature alone is not sufficient to account for the observed results. Not all semi-crystalline materials with higher melting temperatures increased the melt strength. Thus, the selection of these materials is needed to achieve the desired increase in melt strength with mixtures of polycarbonate and PBT. Other materials that were tested and which, based on their semicrystalline nature and higher melting temperatures might be expected to achieve similar results are not in fact effective. Furthermore, as noted above, TSAN results in undesirable surface properties in molded articles. Accordingly, the compositions of the invention are preferably substantially free of TSAN as well as other additives that were found not to increase the melt strength and thermoformability of the composition. As used in the specification and claims of this application, the term "substantially free" refers to compositions which do not contain the designated material in an amount that increase visible surface flaws as compared to a molded article made with an otherwise identical composition made without the designated material.

The polycarbonate used in the compositions of the invention is not particularly limited. Polycarbonates with varying properties are obtained through the use of different monomers, different end-capping components and the like. These polycarbonates may be made by any technique, including without limitation interfacial polymerization, melt polymerization, and solid state polymerization techniques. The polycarbonate may be linear or branched, or a combination of linear and branched species.

In some embodiments, the polycarbonate comprises bisphenol A (BPA polycarbonate). In some embodiments, the polycarbonate comprises THPE branched polycarbonate. In some embodiments, the polycarbonate comprises BPA polycarbonate and THPE polycarbonate. Suitable polycarbonates have molecular weights in the range of 25,000 to 40,000, for example, 100 grade PC which has Mw=30,000 or 130 grade PC which has, Mw=36500, measured using PC standard.

The polycarbonate has a processing temperature that is less than the Tm for the melt strength enhancer. Generally, the processing temperature is above the glass transition temperature of the polycarbonate, e.g., from 80 to 120 C above the glass transition temperature of the polycarbonate. In another embodiment, the processing temperature of the polycarbonate can be from more than 120 to 150 C, or more, above the glass transition temperature of the glass transition temperature of the polycarbonate.

The PBT in the composition of the invention is a suitably a polymer with a molecular weight higher than 80,000 g/mol, as determined by polystyrene standards. Lower molecular weights will tend to lower the melt strength, resulting in smaller processing window.

In some embodiments of the invention, the PBT has a molecular weight of 100,000 to 110,000 for example 105,000 g/mol (PS standards).

The PBT employed in a given composition should have a melting temperature less than Tm for the melt strength enhancer in that composition.

Other Components

The compositions of the invention may include additional components to provide one or more properties to the composition as a whole. These additional materials include impact modifiers, flame retardants, antioxidant and other stabilizers, colorants, quenchers, and the like.

In one particular embodiment of the invention, the composition comprises 1 to 15 wt % of an impact modifying component, such as ethylene/methyl acrylate/glycidyl methacrylate terpolymer. In some embodiments, the amount of impact modifier is 1 to 5 wt %.

The compositions of the invention may also include other impact modifiers such as MBS, ABS and acrylics such as butyl acrylate commonly employed in polycarbonate/polyester blends.

The components discussed above are combined into a thermoformable composition comprising:

(a) 15 to 80% by weight of a polycarbonate resin, for example 20-45% by weight;

(b) 10 to 80% by weight of polybutylene terephthalate, for example 20-40% by weight, and (c) 1 to 15% by weight of a semicrystalline melt strength enhancer selected from the group consisting of polyethylene teraphthalate, polycyclohexanedimethyl terephthalate, polycyclohexanedimethyl terephthalate glycol, and (poly)ethylene co 1,4-cyclohexane-dimethylene terephthlate), and combinations thereof.

In some embodiments, the compositions of the invention contain 2 to 15% by weight of the melt strength enhancer. In other embodiments, the compositions contains 5 to 15% by weight of the melt strength enhancer.

This combination provides a composition that has a thermoforming processing window of at least 15° C., and preferably at least 30° C. for an article having a weight that is more than 100 grams. It will be appreciated that larger weights of material may have smaller forming windows due to the mass of the polymeric material being formed. In some embodiments, the composition has a thermoforming processing window of at least 15° C. for an article having a weight that is more than 500 grams, or for an article having a weight of more than 1000 grams. The composition in some embodiments has a thermoforming processing window of at least 15° C. for an article having a weight that ranges from 100 grams to 50 kilograms. It will be appreciated that this does not mean that the material will not also have a good processing window for lower and higher amounts of material, but only that the processing window is met for articles of the stated sizes.

In one embodiment of the invention, the composition consists essentially of:

(a) 20 to 45% by weight of a polycarbonate resin;

(b) 20 to 40% by weight of polybutylene terephthalate, (c) 5 to 13% by weight of polycyclohexanedimethyl terephthalate;

(d) 1 to 15% by weight of an impact modifying component; and (e) 0 to 30% by weight of additional components selected from the group consisting of colorants, flame retardants, stabilizers, quenchers, and combinations thereof, wherein the composition has a thermoforming processing window of at least 15° C. for an article having a weight that is more than 100 grams; and wherein the composition is substantially free of styrene acrylontirile encapsulated polytetrafluoroethylene, polyamide, polyetheretherketones such as PEEK™, PPO and PPS.

In this composition, the polycarbonate resin suitably comprises a branched polycarbonate resin such as 1,1,1,tris-p-hydroxyphenylethane (THPE) branched polycarbonate, and the impact modifying component suitably comprises ethylene/methyl acrylate/glycidyl methacrylate terpolymer. In some embodiments, the ethylene/methyl acrylate/glycidyl methacrylate terpolymer is present in an amount of from 1 to 5% by weight. The impact modifying component may further comprise methyl methacrylate-butadiene-styrene terpolymer.

In another embodiment of the invention, the composition consists essentially of:

(a) 20 to 45% by weight of a polycarbonate resin;
(b) 20 to 40% by weight of polybutylene terephthalate;
(c) 5 to 13% by weight of polyethylene terephthalate;
(d) 1 to 15% by weight of an impact modifying component; and
(e) 0 to 30% by weight of additional components selected from the group consisting of colorants, flame retardants, stabilizers, quenchers, and combinations thereof, wherein the composition has a thermoforming processing window of at least 15° C. for an article having a weight that is more than 100 grams; and wherein the composition is substantially free of styrene acrylontirile encapsulated polytetrafluoroethylene, nylon, polyetheretherketones such as PEEK™, PPO and PPS.

In some embodiments, the polycarbonate resin suitably comprises a branched polycarbonate resin such as 1,1,1-tris-p-hydroxyphenylethane (THPE) branched polycarbonate, and the impact modifying component suitably comprises ethylene/methyl acrylate/glycidyl methacrylate terpolymer. In some embodiments, the ethylene/methyl acrylate/glycidyl methacrylate terpolymer is present in an amount of from 1 to 5% by weight. The impact modifying component may further comprise methyl methacrylate-butadiene-styrene terpolymer (MBS).

The present invention provides a method for making molded articles using the thermoformable composition of the invention. In accordance with this method, the thermoformable composition is placed into a mold of an appropriate shape for the desired article and processed at a temperature within the processing window to obtain an article of a desired shape. Because of the properties of the thermoformable composition, the article is substantially free of visual defects.

In the method of the invention, the processing temperature is within the processing window is therefore below the melt temperature of the melt strength enhancer.

The processing/molding technique can be extrusion, e.g., sheet extruding or profile extruding; melt spinning; blow molding; injection molding; or thermoforming.

In one embodiment, the invention provides a method for making a molded article comprising the steps of:

(a) obtaining a thermoformable composition as described above,
(b) extruding the thermoformable composition into a sheet;
(c) heating the sheet to within the processing window, and
(d) molding the sheet to obtain an article of a predetermined shape, wherein said molded article is substantially free of visual defects.

The temperature during the molding step is suitably maintained within the processing window.

The compositions of the invention are suitably used for making shaped article. While the compositions can be used to make any molded and shaped article, our compositions are particularly suitable for making articles for transportation, automotive and outdoor vehicle and device (OVAD) applications, including without limitations, cowlings, fenders.

As such, our invention now provides previously unavailable advantages. Notably, manufacturers now have a composition that enables them to use a composition having excellent melt strength and that is capable of producing articles having high quality surfaces. Our compositions perform well in thermoforming processes, and thereby enhance the capability of manufacturers.

The invention will now be demonstrated with reference to the following non-limiting examples. In these examples, the materials as listed in Table 1 were used.

EXAMPLES

Materials

The following materials were used in our Examples.

| Component | Chemical Description and Properties | Source, Vendor |
| --- | --- | --- |
| THPE Branched PC | THPE Branched polycarbonate resin, CAS 111211-39-3 Mw = 37,700 g/mol, PC standard | GE Plastics |
| Linear PC (100 grade) | polycarbonate resin CAS 111211-39-3, Mw = 30,000, PC standard | GE Plastics |
| FR Concentrate | 56% Poly (pentabromobenzyl acrylate) with 72% Br, 0.5% PTFE, 24% antimony oxide and 19.5% PBT | GE Plastics |
| Linear PC (130 grade) | polycarbonate resin CAS 111211-39-3, Mw = 36,500, PC standard | GE Plastics |
| PBT | polybutylene terephthalate, (MW = 105,000 g/mol, ps standard; CAS 30965-26-5 | GE Plastics |
| PCT | polycyclohexyldimethyl terephtahlate; CAS 25135-25-0 Tm = 290° C. | Eastman |
| LOTADER ™ AX8900 | ethyelne/methyl acrylate/glycidyl methacrylate terpolymer, CAS 51541-08-3 | Arkema |
| MBS | methyl methacrylate-butadiene-styrene terpolymer CAS 25053-09-2 | Rohm & Haas |
| TSAN | styrene-acrylonitrile encapulated PTFE CAS 9002-84-0 | GE Plastics |
| NYLON ™ 6,6 | Polyamide 6,6 CAS 32131-17-2; Tm = 265° C. | DuPont |
| PET | polyethylene terephthalate, CAS 250380-59-9, Tm = 264° C. | Invista |
| PPS | polyphenylene sulfide, Tm = 288° C. | TOSOH Corp. |
| PEEK ™ | polyetheretherketone Tm = 343° C. | VICTREX |
| PPO | polyphenylene oxide Tm = 260° C. | GE Plastics |

The "other ingredients" in the listings below are a mixture of heat stabilizers, UV stabilizers, quenchers, colorants and mold release agents.

Examples A-G

As part of a preliminary evaluation on the ability of various materials to enhance the melt strength of polycarbonate/PBT blends, laboratory scale samples were prepared of several compositions as reflected in Table 2 and extruded on an Entek 27 mm co-rotating Twin Screw extruder. For each composition, plaques of 6×8×0.125" (15×20×0.3 cm) were injection molded on a Van Dorn 260 ton press with a set temperature of approximately 250° C. The pellets were typically dried for 3-4 hours at 225° F. in a forced air circulating oven prior to injection molding. A sagging test was performed by placing the plaque on a 15 inch (38 cm) tall rack having a metal platform on top of it. The metal platform was 8×10" (20×25 cm) with a 3×5" (7.6×1.3 cm) rectangular opening in the center. The test apparatus was placed in an oven at the designated temperature and kept in the oven for a period of 7.5 minutes. Softening of the plaque allowed the material to sag through the opening in the metal platform. The distance between the metal platform and the peak of the protruded material resulting from sagging was measured as an indication of melt strength and thermoformability. If the protruded material sagged two (2) or more inches (5 cm), the compositions were deemed unsuitable for thermoforming. If the protruded material sagged less than two (2) or inches (5 cm), the compositions were deemed suitable for thermoforming. The results are shown in Table 2.

TABLE 2

| Component | A | B | C | D | E | F | G |
|---|---|---|---|---|---|---|---|
| THPE branched PC | 37.85 | 37.85 | 37.85 | 37.85 | 37.85 | 37.85 | 37.85 |
| Linear PC (100 grade) | 11.01 | 11.01 | 11.01 | 11.01 | 11.01 | 11.01 | 14.01 |
| PBT | 30.87 | 30.87 | 30.87 | 30.87 | 30.87 | 30.87 | 30.87 |
| 20% LOTADER in PC | 15 | 15 | 15 | 15 | 15 | 15 | 15 |
| PCT | 3 | | | | | | |
| Nylon 6,6 | | 3 | | | | | |
| PPO | | | 3 | | | | |
| PEEK | | | | 3 | | | |
| PPS | | | | | 3 | | |
| PET | | | | | | 3 | |
| Other Ingredients | 2.27 | 2.27 | 2.27 | 2.27 | 2.27 | 2.27 | 2.27 |
| Total | 100 | 100 | 100 | 100 | 100 | 100 | 100 |
| Sagging Distance (Inches) | 1.5 | 0.8 | 3.4 | 4.5 | 3.1 | 0.8 | 3 |

As shown, the results indicate that the materials tested, PCT (composition A) Nylon 6,6 (composition B) and PET (composition F) had enough melt strength to lead to less than 2 inches of sag. The use of PPO, PPS and PEEK did not provide sufficient melt strength, and were therefore were judged to unsuitable and were not tested further. Thermoforming windows for these compositions made at small scale were not tested but the compositions formed the basis for formulating the compositions (i.e. selection of melt strength enhancer) that were used in tests to assess forming window values on a pilot scale the results of which follow in the examples of the invention below.

Examples 1-4

To evaluate compositions, formulations were prepared as shown in Table 3 and extruded on a 40 mm Werner Pfleiderer Twin Screw Extruder.

The extrusion line was of a design similar to that found in larger compounding plants, although the smaller barrel diameter and resultant feed rate capacity make the line suitable for experimentation at the pilot scale. The feeding of all materials occurred at the feed throat of the extruder and was accomplished via the use of loss-in-weight auger or belt feeders attached to the line. Typically, each feeder carried only one raw material. The exceptions are materials present in small percentages. These materials are combined together as a blend, prior to extrusion, and fed as one combined material on a single belt feeder. No unusual compounding conditions were employed during the production of these materials. The combined feed rate of all feeders was 300 lbs per hour and the screw speed was 480 RPM.

The resin pellets were then transformed into sheets 17" (43 cm ) in width and 0.125" (0.3 cm) in thickness) through Davis-Standard Sheet Extrusion Line with Cloeren Sheet Die in Monolayer Configuration without feedblock. Material was dried at 220° F. (104° C.) for 4 hours before extrusion. Sheets were extruded on a 2.5" 24:1 extruder with Barrier Maddock screw (XA268296 LT-2.5:1 Comp ratio). Three-roll vertical downstack with chrome polished rolls were used.

The sheets were then thermoformed on GEISS T8 thermoformer.

Sheets cut to the dimensions of 17"×26" (43.2×66.0 cm) were dried in a desiccant closed loop oven at 180° F. (82° C.) for 12 hrs. Forming temperature was established for each material by evaluating the quality of the formed part using an aluminum thermoforming tool (4.5"×6"×3" or 11.4×15.2×7.6 cm). No pre-vacuum was used. A sheet was heated to set temperature at 50% heater setting, the ovens were shut off and retract. The thermoform tool was raised up and a vacuum was applied to force the sheet to take the form of the tool. This process was repeated at different set temperatures. Lower limits of thermoforming are characterized by a lack of detail or definition in the corners or harder-to-form areas. Upper limits are dictated mainly by the appearance of webbing, indicative of excessive sag of the material. Other indicators include excessive smoking or tearing of the material Articles made with the above-described process and the process for making the articles were evaluated on two features: (1) the forming window and (2) the surface quality. The forming window is the range of temperatures in which an article can be made. Surface quality was evaluated visually. A numerical value was assigned from 1 to 3, 1 being the best. A rating of 1 meant that the surface of the part showed no visual defects. A rating of 2 meant that the surface of the part showed some numerous physical defects on the surface with some regions being defect free. A rating of 3 meant that the surface of the part showed physical defects substantially throughout the entire surface of an article.

An article was deemed to "pass" when the process used to make the article exhibited a forming window of 15° C. or more and the article made by the process exhibited a surface quality of 1.

TABLE 3

| Component | 1 (Comparative) | 2 | 3 | 4 |
|---|---|---|---|---|
| THPE branched PC | 25.9 | 25.9 | 25.9 | 25.9 |
| PBT | 36.4 | 31.4 | 26.4 | 21.4 |
| 20% LOTADER in PC | 10 | 10 | 10 | 10 |
| PCT | | 5 | 10 | 15 |
| MBS | 8 | 8 | 8 | 8 |
| FR concentrate | 14.3 | 14.3 | 14.3 | 14.3 |
| Other ingredients | 5.36 | 5.36 | 5.36 | 5.36 |
| Forming Window (degrees C.) | 10 | 30 | 40 | 20 |
| Surface Quality | 1 | 1 | 1 | 1 |
| Pass/Fail | Fail | Pass | Pass | Pass |

Formulation 1 was a control sample in which a PC/PBT blend is prepared without melt strength enhancing additive. It has a relatively small (10° C.) forming window. Thermoformed parts with good definition were obtained at 205° C. to 215° C. The formed parts had excellent surface and good gloss.

Formulation 2 exhibited the enhanced thermoforming window that is obtained when PCT is added in accordance with the invention at a level of 5%. Thermoformed parts with good definition were obtained at 200° C. to 230° C. The formed parts had excellent surface and good gloss.

Formulation 3 had an even larger thermoforming window with the use of PCT at 10%. Thermoformed parts with good definition were obtained at 205° C. to 245° C. The formed parts had excellent surface and good gloss.

Formulation 4 contained 15% PCT. As shown, there is still an improvement in thermoforming window but a lesser improvement as compared to Formulation 7. Thus, there is an optimum amount for the amount of PCT added. Thermoformed parts with good definition were obtained at 230° C. to 250° C. The formed parts had excellent surface and low gloss.

Examples 5-10

Further tests using the same procedures as described in Examples 1-4 were performed on the compositions listed in Table 4. The compositions and the results are summarized in Table 4

TABLE 4

| Component | 5 | 6 | 7 | 8 | 9 (Comparative) | 10 (Comparative) |
|---|---|---|---|---|---|---|
| THPE branched PC | 41.5 | | 41.86 | 41.86 | 51.86 | 51.26 |
| Linear PC (130 grade) | | 41.5 | | | | |
| PBT | 30.87 | 30.87 | 30.87 | 30.87 | 30.87 | 30.87 |
| 20% LOTADER in PC | 15 | 15 | 15 | 15 | 15 | 15 |
| PCT | 10.36 | 10.36 | | | | 0.6 |
| Nylon 6,6 | | | | 10 | | |
| PET | | | 10 | | | |
| Other ingredients | 2.27 | 2.27 | 2.27 | 2.27 | 2.27 | 2.27 |
| Forming Window (degrees C.) | 30 | 15 | 15 | 15 | <10 | 40 |
| Surface Quality | 1 | 1 | 1 | 2 | 1 | 3 |
| Pass/Fail | Pass | Pass | Pass | Fail | Fail | Fail |

Formulation 5 demonstrated a both wide processing window and great surface were achieved using PCT. This was base formulation with 10.36% PCT. Thermoformed parts with good definition were obtained at 205° C. to 235° C. The formed parts also had excellent surface quality and high gloss.

Formulation 6 showed that linear PC could be used in place of branched PC, although the processing window is not as wide as branched PC. However, the linear PC was still within acceptable limits. Thermoformed parts with good definition were obtained at 210° C. to 225° C. The formed parts also had excellent surface quality and medium gloss.

Formulation 7 showed that a wider processing window can be achieved using PET. Thermoformed parts with good definition were obtained at 215° C. to 225° C. The formed parts had excellent surface and good gloss.

Formulation 8 demonstrated that when nylon was used instead of PCT, an article made from the indicated composition failed. Thermoformed parts with good definition were obtained at 205° C. to 220° C. However, the formed parts had some flow lines on the surface and relatively low gloss.

Formulation 9 is a high PC formulation without additives to assist in the thermoforming. Thermoforming of this sample was attempted at 200, 205, 210, 215 and 225° C. Parts with good definition were obtained at 210° C. At lower temperature, the tool was not replicated sufficiently. At higher temperature, webbing was observed. The formed parts (to the extent obtained) had excellent surface quality.

Formulation 10 showed that TSAN increased the melt strength of semicrystalline blends when used at amount within the normal range (0.1 to 2% by weight) employed as an anti-drip agent. Thermoforming of this sample was attempted in the range of 200 to 260° C. High quality clearly detailed parts exhibiting the features of the mold, were obtained at 210° C. to 250° C. Although TSAN improved thermoformability of the base formulation, surface was terrible. However, non-uniform surfaces (as determined by visual inspection) were observed in all the formed parts, especially at higher temperature.

The invention claimed is:

1. A thermoformable composition comprising: (a) 15 to 80% by weight of a polycarbonate resin; (b) 10 to 80% by weight of polybutylene terephthalate, and (c) 1 to 15% by weight of a semicrystalline melt strength enhancer selected from the group consisting of polycyclohexanedimethyl terephthalate, polycyclohexanedimethyl terephthalate glycol, and (poly)ethylene co 1,4-cyclohexane-dimethylene terephthlate), and combinations thereof; wherein the composition has a thermoforming processing window of at least 15° C.

2. The composition of claim 1, wherein the composition has a thermoforming processing window of at least 30° C.

3. The composition of claim 1, wherein the composition has a thermoforming processing window of at least 15° C. for an article having a weight that is more than 500 grams.

4. The composition of claim 1, wherein the composition has a thermoforming processing window of at least 15° C. for an article having a weight that is more than 1000 grams.

5. The composition of claim 1, wherein the composition has a thermoforming processing window of at least 15° C. for an article having a weight that ranges from 100 grams to 50 kilograms.

6. The composition of claim 1, wherein the composition is substantially free of melt strength enhancers other than the melt strength enhancer of component (c).

7. The composition of claim 1, wherein the composition is substantially free of styrene acrylontirile encapsulated polytetrafluoroethylene, polyamide, polyetheretherketone, PPO, polyetherketone, and PPS.

8. The composition of claim 1, further comprising an impact modifying component.

9. The composition of claim 8, wherein the impact modifying component is selected from the group consisting of ethylene/methyl acrylate/glycidyl methacrylate terpolymer, acrylonitrile styrene butadiene terpolymer, butyl acrylate impact modifier, and combinations thereof.

10. The composition of claim 9, wherein the impact modifying component is present in an amount of from 1 to 5% by weight.

11. The composition of claim 9, wherein the impact modifying component further comprises methyl methacrylate-butadiene-styrene terpolymer.

12. The composition of claim 1, wherein the melt strength enhancer is polycyclohexanedimethyl terephthalate.

13. The composition of claim 12, wherein the composition has a processing window of at least 30° C.

14. The composition of claim 12, wherein the composition is substantially free of melt strength enhancers other than the melt strength enhancer of component (c).

15. The composition of claim 12, wherein the composition is substantially free of styrene acrylontirile encapsulated polytetrafluoroethylene.

16. The composition of claim 12, further comprising an impact modifying component.

17. The composition of claim 16, wherein the impact modifying component comprises ethylene/methyl acrylate/glycidyl methacrylate terpolymer.

18. The composition of claim 17, wherein the ethylene/methyl acrylate/glycidyl methacrylate terpolymer is present in an amount of from 1 to 5% by weight.

19. The composition of claim 18, wherein the impact modifying component further comprises methyl methacrylate-butadiene-styrene terpolymer.

20. The composition of claim 1, wherein the melt strength enhancer is polyethylene terephthalate.

21. The composition of claim 20, wherein the composition has a processing window of at least 30° C.

22. The composition of claim 20, wherein the composition is substantially free of melt strength enhancers other than the melt strength enhancer of component (c).

23. The composition of claim 20, wherein the composition is substantially free of styrene acrylontirile encapsulated polytetrafluoroethylene.

24. The composition of claim 20, further comprising an impact modifying component.

25. The composition of claim 24, wherein the impact modifying component comprises ethylene/methyl acrylate/glycidyl methacrylate terpolymer.

26. The composition of claim 25, wherein the ethylene/methyl acrylate/glycidyl methacrylate terpolymer is present in an amount of from 1 to 5% by weight.

27. The composition of claim 26, wherein the impact modifying component further comprises methyl methacrylate-butadiene-styrene terpolymer.

28. The composition of claim 1, wherein the melt strength enhancer is present in an amount of 2 to 15% by weight.

29. The composition of claim 1, wherein the melt strength enhancer is present in an amount of 5 to 15% by weight.

30. A molded article formed by thermoforming a composition according to claim 1, wherein said molded article is substantially free of visual defects.

31. The article of claim 30, wherein the article is an automotive body part or a seat.

32. The article of claim 30, wherein the melt strength enhancer in the composition is polycyclohexanedimethyl terephthalate.

33. The article of claim 30, wherein the melt strength enhancer in the composition is polyethylene terephthalate.

34. The article of claim 30, wherein the molded article has a measured gloss of 80 or greater.

35. A molding composition consisting essentially of: (a) 20 to 45% by weight of a polycarbonate resin; (b) 20 to 40% by weight of polybutylene terephthalate, (c) 5 to 13% by weight of polycyclohexanedimethyl terephthalate; (d) 1 to 15% by weight of an impact modifying component; and (e) 0 to 30% by weight of additional components selected from the group consisting of colorants, flame retardants, stabilizers, quenchers, and combinations thereof; wherein the composition has a thermoforming processing window of at least 15° C. for an article having a weight that is more than 100 grams; and wherein the composition is substantially free of styrene acrylontirile encapsulated polytetrafluoroethylene, polyamide, polyetheretherketone, PPO, polyetherketone, and PPS.

36. The molding composition of claim 35, wherein the polycarbonate resin comprises a branched polycarbonate resin.

37. The molding composition of claim 36, wherein the branched polycarbonate resin is 1,1,1-tris p hydroxyphenylethane (TBPE) branched polycarbonate.

38. The composition of claim 37, the impact modifying component comprises ethylene/methyl acrylate/glycidyl methacrylate terpolymer.

39. The composition of claim 38, wherein the ethylene/methyl acrylate/glycidyl methacrylate terpolymer is present in an amount of from 1 to 5% by weight.

40. The composition of claim 38, wherein the impact modifying component further comprises methyl methacrylate-butadiene-styrene terpolymer.

41. A molded article formed by thermoforming a composition according to claim 35, wherein said molded article is substantially free of visual defects.

* * * * *